United States Patent
Patil et al.

(10) Patent No.: US 9,229,819 B2
(45) Date of Patent: *Jan. 5, 2016

(54) ENHANCED RELIABILITY IN DEDUPLICATION TECHNOLOGY OVER STORAGE CLOUDS

(71) Applicant: INTERNATIONAL BUSINESS MACHINES CORPORATION, Armonk, NY (US)

(72) Inventors: Sandeep R. Patil, Pune (IN); Sri Ramanathan, Lutz, FL (US); Riyazahamad M. Shiraguppi, Pune (IN); Prashant Sodhiya, Pune (IN); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,442

(22) Filed: Oct. 27, 2014

(65) Prior Publication Data

US 2015/0046410 A1 Feb. 12, 2015

Related U.S. Application Data

(63) Continuation of application No. 13/455,528, filed on Apr. 25, 2012, now Pat. No. 8,903,764.

(51) Int. Cl.
*G06F 17/30* (2006.01)
*G06F 11/14* (2006.01)

(52) U.S. Cl.
CPC ........ *G06F 11/1453* (2013.01); *G06F 17/3053* (2013.01); *G06F 17/30156* (2013.01); *G06F 17/30489* (2013.01)

(58) Field of Classification Search
USPC ............................ 707/37–638, 690–692, 770
See application file for complete search history.

(56) References Cited

U.S. PATENT DOCUMENTS

| 5,727,144 | A | 3/1998 | Brady et al. |
|---|---|---|---|
| 6,484,161 | B1 | 11/2002 | Chipalkatti et al. |
| 7,065,588 | B2 * | 6/2006 | Konda ............... G06F 17/30569 707/E17.006 |
| 7,092,956 | B2 | 8/2006 | Ruediger |
| 7,191,283 | B2 | 3/2007 | Amemiya et al. |
| 7,269,648 | B1 * | 9/2007 | Krishnan et al. .............. 709/224 |
| 7,567,188 | B1 | 7/2009 | Anglin et al. |
| 8,099,428 | B2 | 1/2012 | Kottomtharayil et al. |
| 2009/0300712 | A1 | 12/2009 | Kaufmann et al. |

(Continued)

OTHER PUBLICATIONS

Kim, C. et al.,"Rethinking Deduplication in Cloud: From Data Profiling to Blueprint", 2011 7th International Conference on Networked Computing and Advanced Information Management (NCM), Jun. 2011, pp. 101-104.

(Continued)

*Primary Examiner* — Hanh Thai
(74) *Attorney, Agent, or Firm* — Matthew Chung; Roberts Mlotkowski Safran & Cole, P.C.

(57) ABSTRACT

Methods and systems for enhancing reliability in deduplication over storage clouds are provided. A method includes: determining a weight for each of a plurality of duplicate files based on parameters associated with a respective storage device of each of the plurality of duplicate files; and designating one of the plurality of duplicate files as a master copy based on the determined weight.

16 Claims, 7 Drawing Sheets

(56) References Cited

U.S. PATENT DOCUMENTS

| | | |
|---|---|---|
| 2009/0313312 A1* | 12/2009 | Colbeck et al. ............... 707/205 |
| 2010/0082558 A1 | 4/2010 | Anglin et al. |
| 2010/0250501 A1 | 9/2010 | Mandagere et al. |
| 2010/0332401 A1 | 12/2010 | Prahlad et al. |
| 2011/0022812 A1 | 1/2011 | van der Linden et al. |
| 2011/0161291 A1 | 6/2011 | Taleck et al. |
| 2011/0185133 A1 | 7/2011 | Reiter et al. |
| 2011/0320865 A1 | 12/2011 | Jain et al. |
| 2012/0084414 A1 | 4/2012 | Brock et al. |
| 2012/0084445 A1 | 4/2012 | Brock et al. |
| 2012/0089579 A1 | 4/2012 | Ranade et al. |
| 2012/0089775 A1 | 4/2012 | Ranade et al. |
| 2012/0166403 A1 | 6/2012 | Kim et al. |
| 2013/0036100 A1 | 2/2013 | Nagpal et al. |
| 2013/0054518 A1 | 2/2013 | Anglin et al. |
| 2013/0110793 A1 | 5/2013 | Chavada et al. |
| 2013/0185258 A1 | 7/2013 | Bestler et al. |
| 2013/0339848 A1 | 12/2013 | Patil et al. |

OTHER PUBLICATIONS

Tan, Y. et al., "SAM: A Semantic-Aware Multi-Tiered Source De-Duplication Framework for Cloud Backup", Proceedings of the 39th International Conference on Parallel Processing (ICPP '10), 2010, 10 pages.

Lokeshwari, Y. V. et al., "Optimized Cloud Storage with High Throughput Deduplication Approach", Proceedings published by International Journal of Computer Applications (IJCA) International Conference on Emerging Technology Trends (ICETT), 2011, pp. 32-37.

Sun, Z. et al., "DeDu: Building a Deduplication Storage System Over Cloud Computing", 15th International Conference on Computer Supported Cooperative Work in Design (CSCWD), Jun. 2011, pp. 348-355.

Mell, P., "The NIST Definition of Cloud Computing", National Institute of Standards of Technology, Information Technology Laboratory, Ver 15, Oct. 7, 2009, pp. 1-2.

* cited by examiner

| Device ID | Vendor Weight (Static1) | MTBF (Static2) | Read Performance (Static3) | Write Performance (Static4) | Availability (Static5) | Durability (StaticM) |
|---|---|---|---|---|---|---|
| A | 100 | 10 | 2 | 2 | 100 | 8 |
| B | 80 | 10 | 1.4 | 2.1 | 90 | 6 |

520:

| Device ID | Head Flying Height (Dynam1) | Remapped Sectors (Dynam2) | Error Counts (Dynam3) | Spin-Up Time (Dynam4) | Temperature (Dynam5) | Data Throughput (DynamN) |
|---|---|---|---|---|---|---|
| A | 40 | 1000 | 500 | 25 | 95 | 33 |
| B | 50 | 2500 | 800 | 23 | 115 | 37 |

530:

| β1 | β2 | β3 | β4 | β5 | βM |
|---|---|---|---|---|---|
| 0.05 | 0.9 | 2.2 | 2.0 | 0.04 | 0.9 |

540:

| δ1 | δ2 | δ3 | δ4 | δ5 | δN |
|---|---|---|---|---|---|
| 0.2 | -0.005 | -0.01 | -0.3 | -0.1 | 0.3 |

550:

$$\text{Weight} = \beta_1 \ast \text{Static1} + \beta_2 \ast \text{Static2} + \beta_3 \ast \text{Static3} + \beta_4 \ast \text{Static4} + \beta_5 \ast \text{Static5} + \beta_M \ast \text{StaticM} + \delta_1 \ast \text{Dynam1} + \delta_2 \ast \text{Dynam2} + \delta_3 \ast \text{Dynam3} + \delta_4 \ast \text{Dynam4} + \delta_5 \ast \text{Dynam5} + \delta_N \ast \text{DynamN}$$

FIG. 5

ENHANCED RELIABILITY IN DEDUPLICATION TECHNOLOGY OVER STORAGE CLOUDS

TECHNICAL FIELD

The present invention generally relates to cloud computing and, more particularly, to methods and systems for enhancing reliability in deduplication over storage clouds.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of interconnected data centers, computing units and storage systems spread across geographies.

A public storage cloud which stores customer data and is spanned across geographies commonly has a large number of redundant files across storage hubs in different locations and countries. In order to improve the efficiency of a cloud storage business, a vendor typically applies data deduplication to address the redundant data issue.

Data deduplication is a storage concept where redundant data is eliminated to significantly shrink storage requirements and improve bandwidth efficiency. In the deduplication process, duplicate data is deleted leaving only one copy of the data to be stored. This single copy is called a master copy and each deleted copy (referred to as a secondary copy) keeps a reference pointer which points to this master copy. Some data deduplication techniques deduplicate the data in a cloud spread across many storage hubs located in different datacenters across heterogeneous storage devices.

Deduplication can be accomplished using post deduplication and/or inline deduplication. In the case of post deduplication, there is no overhead of deduplication on in-band traffic. Data is stored on devices as it arrives without any concern for deduplication during this initial storing. A post deduplication daemon eventually runs sometime after the initial storing and scans devices for duplicate copies and attempts to remove redundant copies. In the case of inline deduplication, deduplication is done on in-band traffic, e.g., essentially in real time during the initial storing of the data. For example, for an incoming write request, a search is performed to determine whether the given data item already exists in the system. In the case that an already-existing copy (e.g., duplicate file) is found in the system, the write operation for the incoming write request is avoided and, instead, a data item pointer is created to point to the existing copy.

Deduplication can be performed at different levels of granularity within a computing environment, such as at the device level, storage pool level, and storage system level. At the device level, the scope of duplicate copy identification is limited to a single individual device. Storage pool level deduplication is applied to a collection of devices of a same type, which can be at a single storage pool or storage pools of homogeneous type. Storage system level deduplication applies to multiple storage device pools with devices of similar or heterogeneous type, with the scope of duplicate copies identification being at the overall system level.

Data deduplication techniques that address the redundant data issue by keeping a single master copy and deleting other redundant copies are not designed to intelligently select a storage drive on which to keep the master copy. Instead, such deduplication systems simply retain the master copy at the physical storage location where the first occurrence of one of the plural duplicate files was detected. If this location happens to be on relatively unreliable storage, then the master copy may later become unavailable due to hardware failure or other factors, causing disruption of data availability in the storage cloud.

For example, in device level deduplication, two copies of the same data may be stored respectively at two different sectors of a disk, e.g., Copy1 stored at an inner disk sector and Copy2 stored at an outer disk sector. In the case where the deduplication mechanism identifies Copy1 first, it will delete Copy2 and replace Copy2 with a pointer to Copy1. However, disk operation performance is usually higher on outer sectors of a disk compared to inner sectors. By saving the master copy (e.g., Copy1) on an inner sector, a user accessing Copy2 may suffer degradation in performance since they are actually accessing a file stored at an inner sector rather than a file stored at an outer sector.

As another example, at storage pool level deduplication, the deduplication mechanism does not consider the distribution of plural master copies across storage devices. By chance, one storage device can end up storing a disproportionately large number of master copies and become overloaded compared to other storage devices in the pool. Moreover, the deduplication mechanism does not consider the active health of the various available storage devices in the pool. As such, a master copy may be stored on a device with relatively bad health and that is likely to fail.

Storage system level deduplication can magnify the above problems associated with performance, load distribution, and health. Moreover, storage system level deduplication can suffer quality of service (QoS) issues. For example, a storage system may include a relatively low reliability first storage (e.g., a JBOD (Just a Bunch Of Disks) controller) and a relatively high reliability second storage (e.g., a RAID (Redundant Array of Independent Disks) controller). QoS requirements may mandate storage in a RAID controller. However, a deduplication mechanism that does not differentiate between the JBOD and RAID storage may save the master copy at the JBOD storage instead of the RAID storage. In such a case, the storage provider may not meet desired QoS levels and/or clients accessing a copy designated on RAID controller might suffer in terms of performance.

SUMMARY

In a first aspect of the invention, a method is implemented in a computer infrastructure including a combination of hardware and software. The method includes determining a weight for each of a plurality of duplicate files based on parameters associated with a respective storage device of each of the plurality of duplicate files. The method also includes designating one of the plurality of duplicate files as a master copy based on the determined weight.

In another aspect of the invention, a system is implemented in hardware and includes a computer infrastructure operable to identify duplicate files stored at different storage devices. The computer infrastructure is also operable to determine a weight for each one of the duplicate files based on parameters associated with the storage devices. The computer infrastructure is also operable to designate one of the duplicate files as a master copy based on the determined weights.

In an additional aspect of the invention, a computer program product includes a computer usable storage medium having readable program code embodied in the storage medium. The computer program product includes at least one component operable to determine a hash value for each of a plurality of files. The at least one component is also operable to determine a set of duplicate files based on the hash values. The at least one component is also operable to determine a weight for each one of the duplicate files, wherein the weight is based on parameters associated with storage devices. The at least one component is also operable to designate a master copy of the set based on the weight of each one of the duplicate files. The at least one component is also operable to nominate remaining files in the set, other than the master copy, for deletion.

In a further aspect of the invention, a method of deduplication includes providing a computer infrastructure being operable to determine a hash value for each of a plurality of files. The computer infrastructure is also operable to define sets of the plurality files based on the hash values. The computer infrastructure is also operable to, for each respective one of the sets: determine a highest weight file in the respective set, wherein the weight is based on parameters associated with storage devices; designate the highest weight file as a master copy for the respective set; and nominate remaining files in the respective set, other than the master copy, for deletion.

In another aspect of the invention, a computer system for file deduplication includes a CPU, a computer readable memory and a computer readable storage media. The system includes first program instructions to identify a set of duplicate files. The system includes second program instructions to determine a weight for each one of the duplicate files. The system includes third program instructions to designate a master copy of the set based on the weight of each one of the duplicate files. The system includes fourth program instructions to delete remaining files of the set, other than the master copy, and replace the remaining files with respective pointers pointing to the master copy. The first, second, third, and fourth program instructions are stored on the computer readable storage media for execution by the CPU via the computer readable memory. The weight is based on parameters associated with storage devices and weighting factors defined for the parameters. The parameters are related to at least one of reliability, health, and user preference of the storage devices.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to cloud computing and, more particularly, to methods and systems for enhancing reliability in deduplication over storage clouds. In accordance with aspects of the invention, a master copy of a set of duplicate files is chosen based on parameters relating to reliability, health, and/or user preference of the respective storage devices on which the duplicate files are stored. The parameters may include static and/or dynamic parameters associated with the respective storage devices. In embodiments, a respective weight is determined for each one of the duplicate files based on the parameters. The file having the highest weight is nominated as the master copy and the other files having lower weights are nominated for deletion. In this manner, implementations of the invention advantageously provide methods and systems for intelligently selecting a master copy based on predefined parameters associated with reliability, health, and/or user preference of the storage devices on which duplicate files are stored.

In accordance with aspects of the invention, the nomination of the master copy for a set of duplicate files is influenced based on parameters associated with a storage device of each file. The parameters may include, for example, SMART (Self Monitoring Analysis and Reporting Technology) attributes; reliability attributes (e.g., RAID levels); user-preferred vendors; and QoS attributes. For example, SMART is a technology that enables a computer to predict the future failure of hard disk drives and has become an industry standard for hard drive manufacturers. Through the SMART technology, hard disk drives incorporate a suite of advanced diagnostics that monitor the internal operations of a drive and provide an early warning for many types of potential problems. When a potential problem is detected, the hard drive can be repaired or replaced before any data is lost or damaged. According to aspects of the invention, a deduplication process includes selecting a master copy at least partly based on SMART information associated with the storage device of each file in the set of redundant files being deduplicated.

RAID is a technology that provides increased storage functions and reliability through redundancy that is achieved by combining multiple disk drive components into a logical unit, where data is distributed across the drives in one of several ways called RAID levels. Administrators may have choice over different RAID level governed storage systems for appropriate reliability and/or performance. According to aspects of the invention, a deduplication process includes selecting a master copy at least partly based on storage device reliability information, such as RAID information.

System administrators may prefer storage devices associated with particular vendors and/or manufacturers over those provided by other vendors and/or manufacturers. According to aspects of the invention, a deduplication process includes selecting a master copy at least partly based on user preferences of sources of storage devices.

QoS parameters are commonly specified for storage devices. The QoS parameters may include, for example, maximum sequential and random READ/WRITE performance in megabytes per second (MB/s), as well as measures for availability, durability, and mean time between failure.

According to aspects of the invention, a deduplication process includes selecting a master copy at least partly based on QoS parameters.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
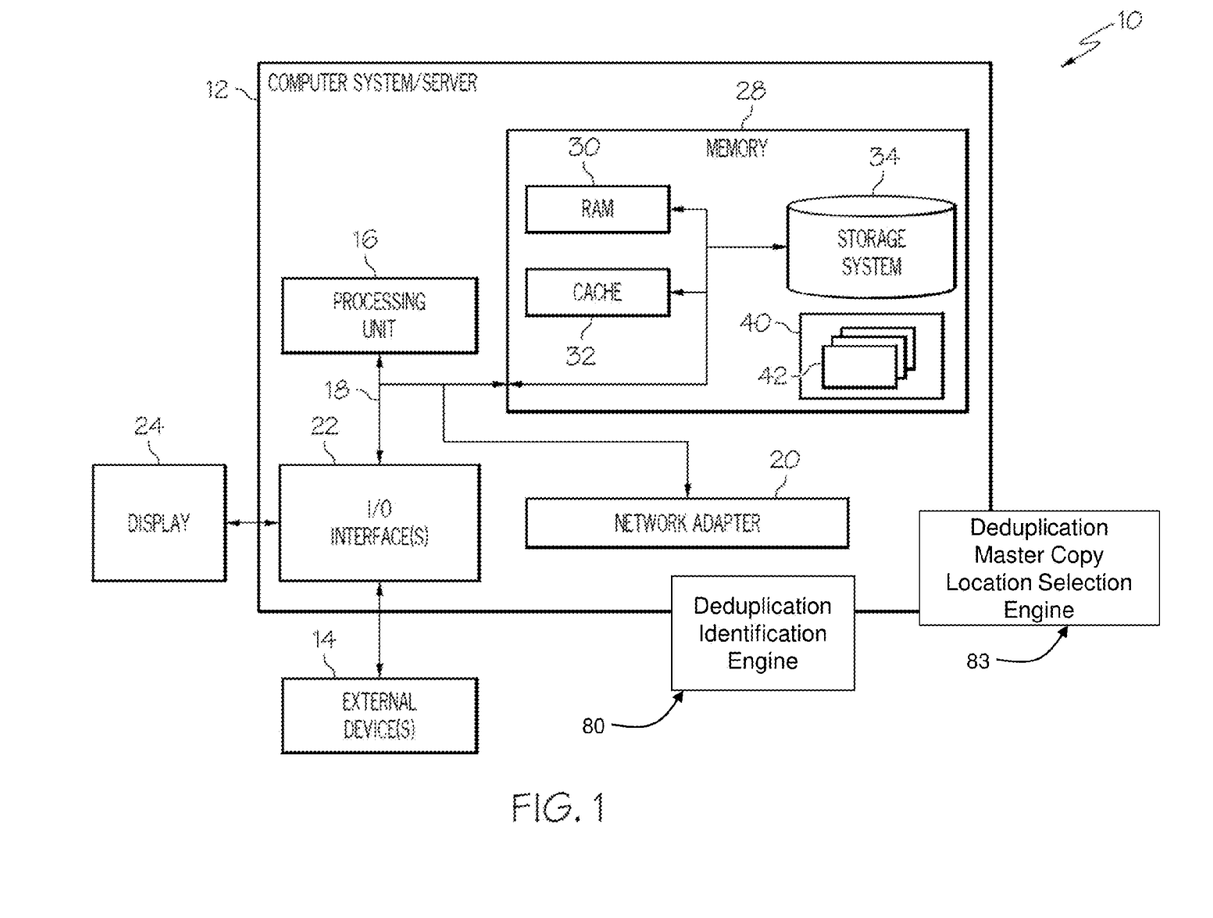
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a deduplication identification engine 80 (referred to herein as identification engine 80) and a deduplication master copy location selection engine 83 (referred to herein as selection engine 83) as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the identification engine 80 and/or selection engine 83 may be implemented as one or more of the program modules 42. Additionally, the identification engine 80 and/or selection engine 83 may be implemented as separate dedicated processors or a single or several processors to provide the functionality described herein. In embodiments, the identification engine 80 and/or selection engine 83 performs one or more of the processes described herein, including but not limited to: identify sets of redundant files eligible for deduplication; determine a weight for each file in each set; and nominate the highest weighted file in each set as the master copy for that set.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
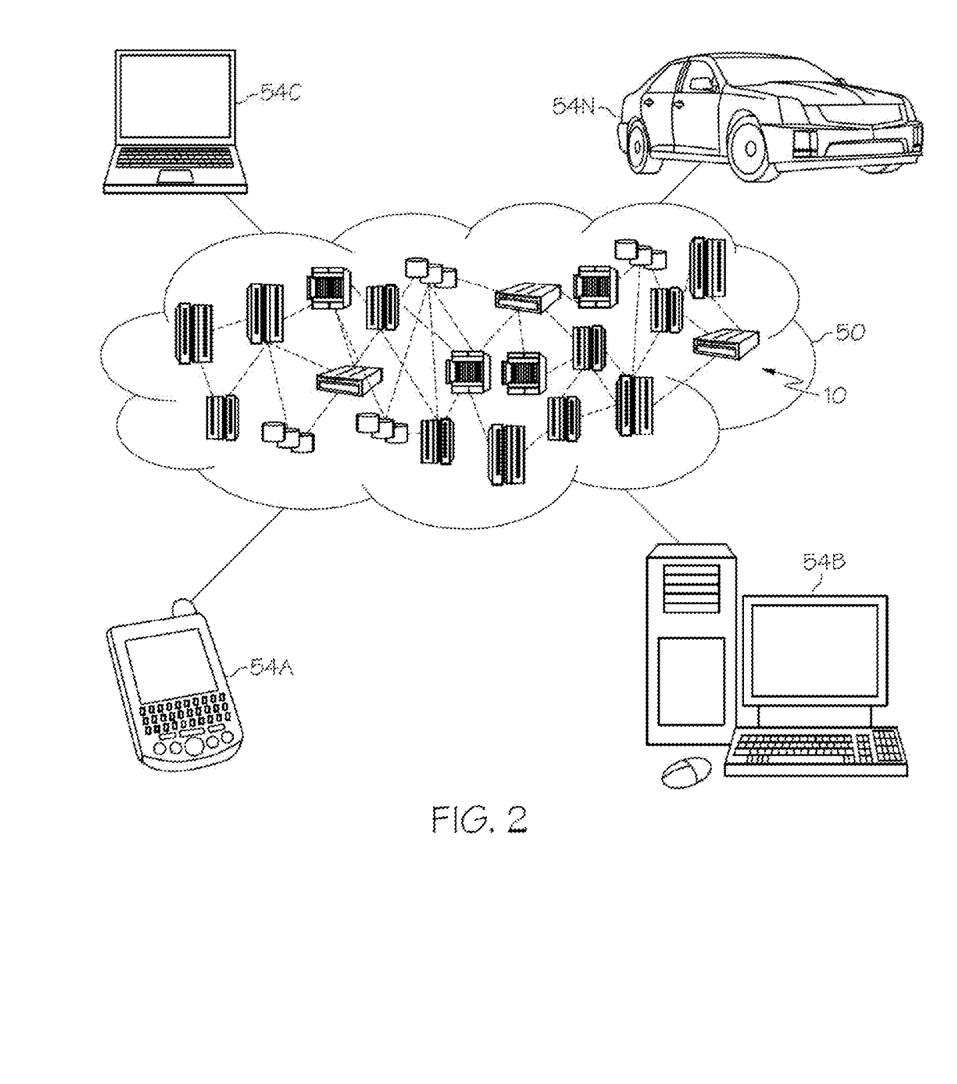
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
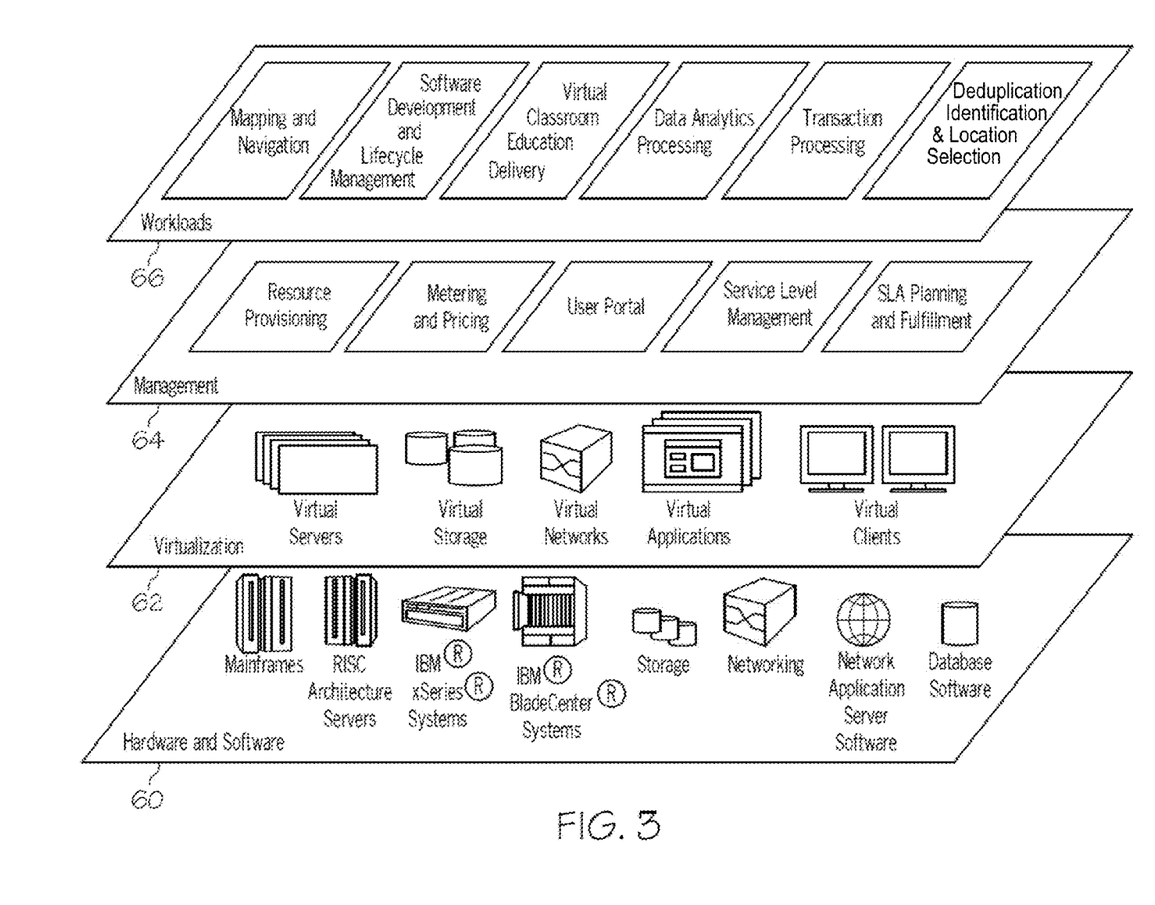
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and deduplication identification and location selection. In accordance with aspects of the invention, the deduplication identification and location selection workload/function operates to perform one or more of the processes described herein, including but not limited to: identify sets of redundant files eligible for deduplication; determine a weight for each file in each set; and nominate the highest weighted file in each set as the master copy for that set.

As will be appreciated by one skilled in the art, aspects of the present invention, including the identification engine 80 and/or selection engine 83 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
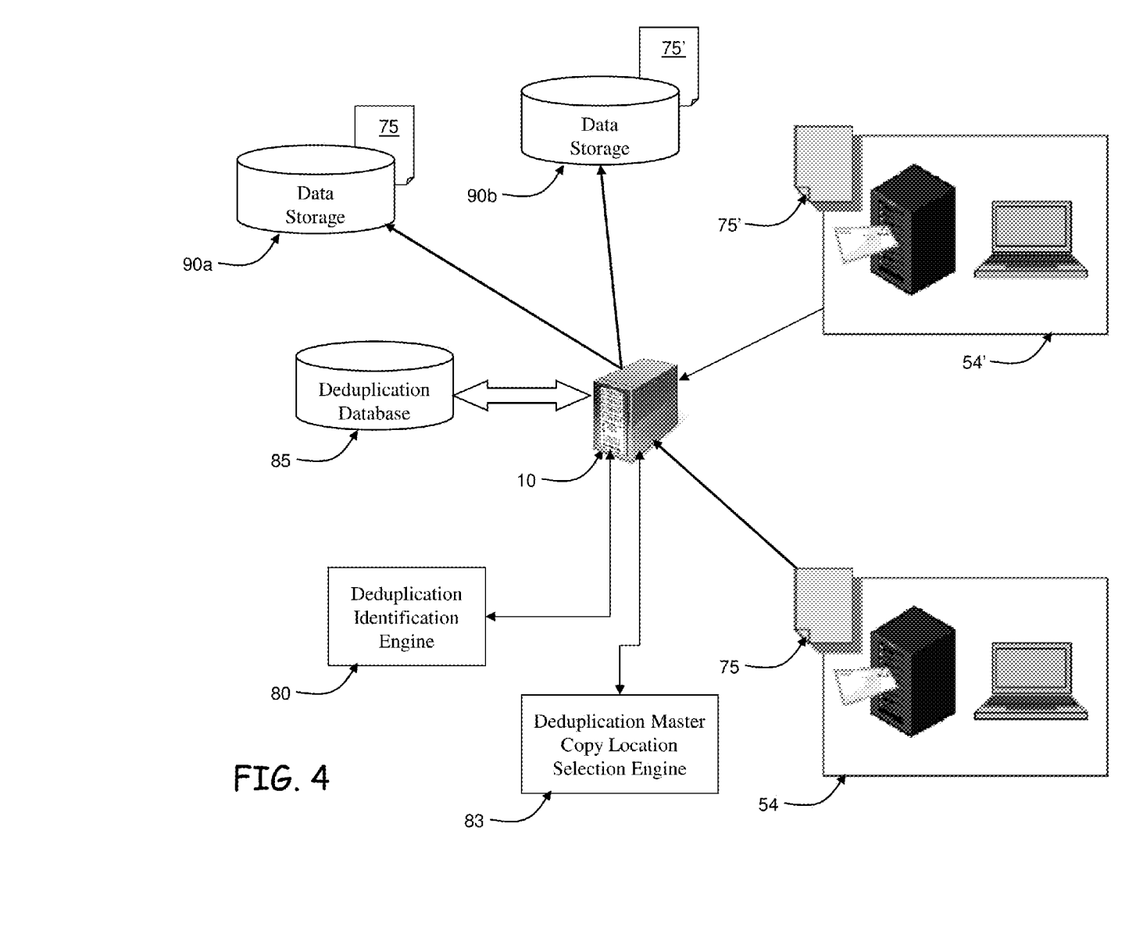
FIG. 4 depicts a data deduplication block diagram in accordance with aspects of the invention.

FIG. 4 depicts a deduplication block diagram in accordance with aspects of the invention. In embodiments, files (or other data) 75 and 75' flow from one or more local computing devices 54, 54' to a deduplication system comprising computing node 10 and a plurality of data storage devices 90a and 90b, which may comprise, for example, storage nodes in the cloud as depicted in FIG. 2. The local computing device 54 and 54' may be similar to the local computing devices 54A-N depicted in FIG. 2. The node 10 may include or communicate with the identification engine 80 and selection engine 83 described herein. The node 10 may also include or communicate with a deduplication database 85, as described in greater detail herein. Although only two files 75 and 75' and storage devices 90a and 90b are shown, it is to be understood that any number of files and storage devices may be used within the scope of the invention, and the number of files may differ from the number of storage devices.

In a post deduplication implementation in accordance with aspects of the invention, the files 75 and 75' are stored on the respective storage devices 90a and 90b. At a later time after the files 75 and 75' are stored, the identification engine 80 and selection engine 83 perform a deduplication process to select a master copy and delete redundant copies of the files. In embodiments, the identification engine 80 identifies the files 75 and 75' as duplicate files eligible for deduplication. Based on the identification of files 75 and 75' as duplicates, the selection engine 83 determines a respective weight for each one of the files 75 and 75' based on one or more static parameters and/or one or more dynamic parameters associated with the storage devices 90a and 90b on which the files 75 and 75' are stored. In embodiments, the selection engine 83 nominates the file 75 or 75' having the highest weight as the master copy and nominates the other file for deletion.

In an inline deduplication implementation in accordance with aspects of the invention, one file (e.g., file 75) is stored at a storage device (e.g., data storage 90a). At a later time, the computing device 54' issues a command to save file 75' (e.g., to storage device 90b). Upon receipt of the command to save file 75', the identification engine 80 searches all available storage devices for duplicate files and identifies file 75 as being a duplicate to file 75'. Based on the identification of files 75 and 75' as duplicates, the selection engine 83 determines a respective weight for each one of the files 75 and 75' based on one or more static parameters and/or one or more dynamic parameters associated with the storage devices 90a and 90b. In embodiments, the selection engine 83 nominates the file 75 or 75' having the highest weight as the master copy and nominates the other file for deletion. For example, when the already-stored file (e.g., file 75 at storage device 90a) has a higher weight than file 75', then file 75' is not stored at storage device 90b. Instead, a pointer is created for file 75' that points to file 75 (e.g., the master copy in this instance). On the other hand, when file 75' has a higher weight than file 75, then file 75' is designated as the master copy and stored at storage device 90b and file 75 is deleted and replaced with a pointer that points to file 75'.

In both the post deduplication and inline deduplication implementations, the identification engine 80 may identify duplicate files using hash algorithms, as is understood in the art. For example, the identification engine 80 may run a hash algorithm that generates a unique key for each file 75 and 75'. The identification engine 80 compares the unique key for each file to keys stored in the deduplication database 85, e.g., by looking up the unique key for each file in the deduplication database 85 to determine if the key already exists (which indicates that the particular file has been previously written to one of the storage devices).

Moreover, in both the post deduplication and inline deduplication implementations, the static parameters may be stored at the deduplication database 85, which may be separate from or included in the node 10. In embodiments, the dynamic parameters may be determined by the selection engine 83 by polling each storage device 90a and 90b during the deduplication process. Alternatively, the dynamic parameters may be communicated by each storage device 90a and 90b to the deduplication database 85 and stored therein at regular intervals, and the selection engine may determine the dynamic parameters by accessing the deduplication database 85.

Figure 5:
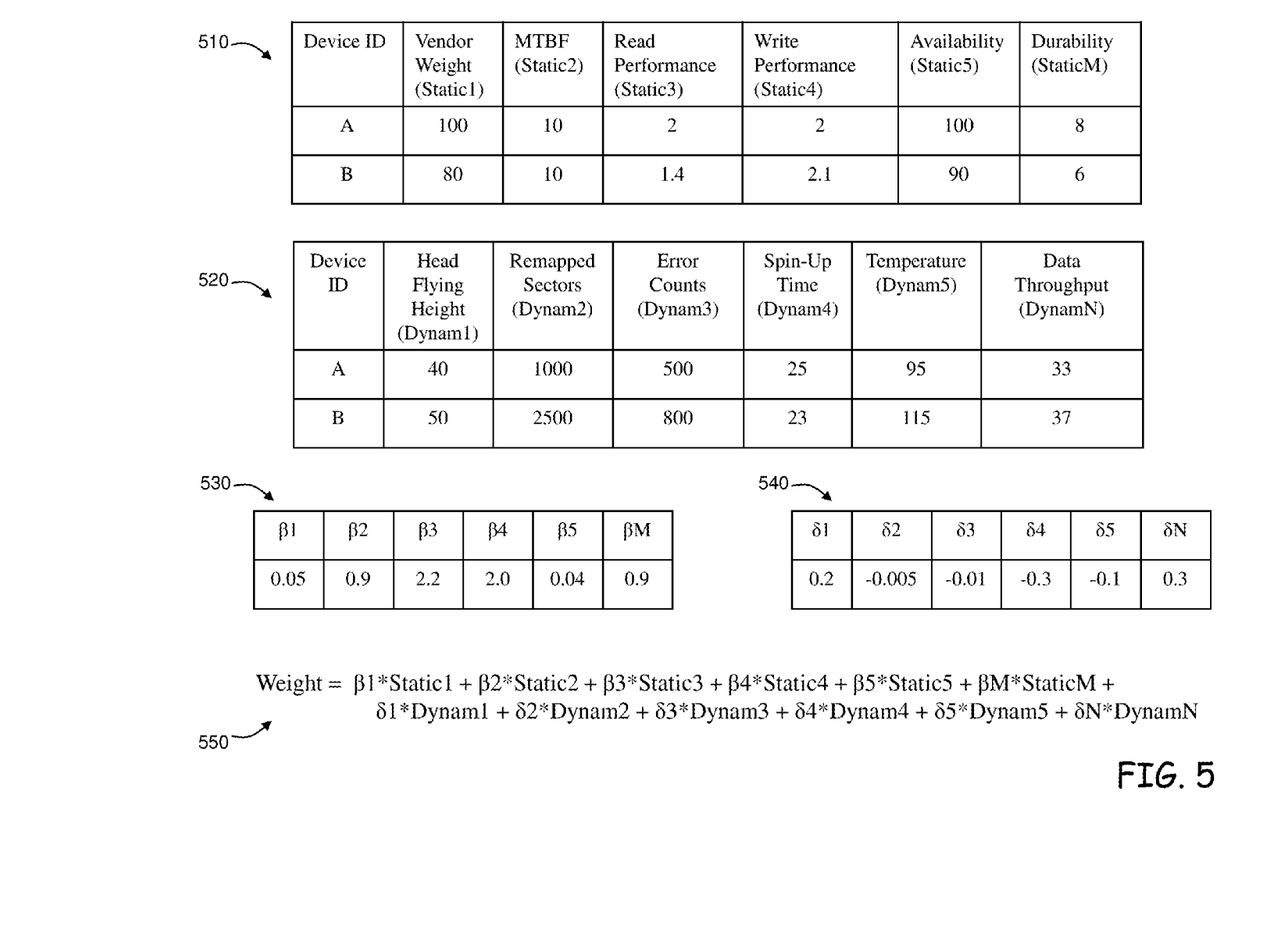
FIG. 5 depicts exemplary parameters and weighting in accordance with aspects of the invention.

FIG. 5 depicts exemplary static and dynamic parameters and weighting in accordance with aspects of the invention. The types and numbers of different parameters used in determining a weight in accordance with aspects of the invention is not limited to the example depicted in FIG. 5 and, instead, any number and type of static parameters and/or any number and type of dynamic parameters may be used in determining a weight of a file within the scope of the invention.

Table 510 depicts examples of static parameters (e.g., Static1, Static2, . . . , StaticM) for devices "A" and "B" in accordance with aspects of the invention. In this example, the static parameters include: vendor weight; MTBF (mean time between failure); read performance; write performance; availability; and durability. In embodiments, the devices "A" and "B" correspond to storage devices in a cloud environment or other multi-device storage system. For example, the devices "A" and "B" may correspond respectively to storage devices 90a and 90b described in FIG. 4.

According to aspects of the invention, a value (e.g., a numeric value) is provided for each static parameter (e.g., Static1, Static2, . . . , StaticM) for each device (e.g., "A" and "B"). For example, device "A" has a value of "100" for Static1, a value of "10" for Static2, and value of "2" for Static3, etc. Similarly device "B" has a value of "80" for Static1, a value of "10" for Static2, and value of "1.4" for Static3, etc.

In accordance with aspects of the invention, the numeric values for the static parameters represent a valuation of each device that can be used to compare one device to another. For example, device "A" has a value of "100" for Static1, whereas device "B" has a value of "80" for Static1. As such, device "A" is preferable to device "B" in terms of the vendors that supply the respective devices (e.g., seller and/or manufacturer of the storage device). As another example, devices "A" and "B" have respective values of "2" and "2.1" for Static4, meaning that device "B" is preferable to device "A" in terms of write performance.

In embodiments, the numeric values for the static parameters for each device are predefined and stored, e.g., in deduplication database 85. Each numeric value may be manually input by a user (e.g., using I/O interface 22) and/or automatically populated in the database 85 by a vendor and/or service provider.

Still referring to FIG. 5, table 520 depicts examples of dynamic parameters (e.g., Dynam1, Dynam2, . . . , DynamN) for devices "A" and "B" in accordance with aspects of the invention. The devices "A" and "B" in table 520 correspond to the same devices "A" and "B" of table 510.

In embodiments, the dynamic parameters are SMART attributes. In the example shown in FIG. 5, Dynam1 is a SMART attribute representing the head flying height of a storage device. A downward trend in flying height will often presage a head crash. Dynam2 is a SMART attribute representing the number of remapped sectors. A storage device may be approaching failure when the drive is remapping many sectors due to internally-detected errors. Dynam3 is a SMART attribute representing ECC (Error Correction Code) use and error counts associated with a storage device. A high number of errors encountered by the drive, even if corrected internally, often indicates a reliability problem with the storage device. The trend, as well as the actual count, can be informative. Dynam4 is a SMART attribute representing the spin-up time associated with a storage device. High spin-up times and/or changes in spin-up time can reflect problems with the spindle motor. Dynam5 is a SMART attribute representing the temperature associated with a storage device. High temperatures and/or increases in drive temperature often signal spindle motor problems. DynamN is a SMART attribute representing the data throughput associated with a storage device. Low data transfer rate of the drive can signal various internal problems with the storage device.

According to aspects of the invention, a value (e.g., a numeric value) is provided for each dynamic parameter (e.g., Dynam1, Dynam2, . . . , DynamN) for each device (e.g., "A" and "B"). For example, device "A" has a value of "40" for Dynam1, a value of "1000" for Dynam2, and value of "500" for Dynam3, etc. Similarly, device "B" has a value of "50" for Dynam1, a value of "2500" for Dynam2, and value of "800" for Dynam3, etc.

In embodiments, the numeric values for the dynamic parameters are automatically updated periodically after some fixed time interval. As but one example, a client application residing at a particular storage device (e.g., Device ID "A" corresponding to storage device 90a) may periodically transmit values of the dynamic parameters for that storage device to the deduplication database 85 (e.g., the values are pushed by the storage devices). In another example, an application periodically polls the various storage devices and obtains the values of the dynamic parameters for each storage device (e.g., the values are pulled from the storage devices). In yet another example, the selection engine 83 obtains the values of the dynamic parameters for each storage device in real time during a deduplication process, e.g., by polling the various storage devices.

Still referring to FIG. 5, tables 530 and 540 contain weighting factors (β1, β2, . . . , βM and δ1, δ2, . . . , δN) that correspond to the static and dynamic parameters of tables 510 and 520, respectively. For example, weighting factor β1 corresponds to static parameter Static1, weighting factor β2 corresponds to static parameter Static2, etc. Also, weighting factor δ1 corresponds to dynamic parameter Dynam1, weighting factor δ2 corresponds to dynamic parameter Dynam2, etc. The weighting factors are used in conjunction with the static and dynamic parameters to determine a weight for any given file based on the attributes of the storage device where the file is stored. The numeric values of the weighting factors can be user defined, system defined, or provided by a third party (e.g., service provider). The weighting factors can be stored in the deduplication database 85. In embodiments, the numeric values of the weighting factors can be initially defined and later adjusted to provide any desired relative weighting to the static and dynamic parameters. For example, the numeric values of the weighting factors can be defined to substantially normalize the static and dynamic parameters, so that each parameter has substantially the same weight, although any other desired weighting schemes may be used within the scope of the invention.

Expression 550 of FIG. 5 depicts an exemplary formula for determining a weight of a file in accordance with aspects of the invention. In embodiments, the weight of a given file is determined by summing the products of the weighting factors and corresponding static and dynamic parameters, as shown by expression 550. Using the data in tables 510, 520, 530, and 540 and the expression 550, the selection engine 83 determines the weight for a file stored at location "A" (e.g., file 75 stored at storage device 90a) to be 24.5. Similarly, the selection engine 83 determines the weight for a file stored at location "B" (e.g., file 75' stored at storage device 90b) to be 11.5. In embodiments, the selection engine 83 designates the file with the highest weight as the master copy. Accordingly, based on these determined weights in this example, the selection engine 83 designates the file stored at location "A" (e.g., file 75 stored at storage device 90a) as the master copy and nominates the file stored at location "B" (e.g., file 75' stored at storage device 90b) for deletion and replacement with a pointer to the master copy. An alternate and equivalent way of writing Expression 550 is:

$$\text{Weight} = \left(\sum_{m=1}^{M} \beta_m * Static_m\right) + \left(\sum_{n=1}^{N} \delta_n * Dynam_n\right)$$

where:
"$Static_m$" is a value of an $m^{th}$ static parameter associated with the storage device of the particular one of the plurality of files;
"β" is a value of an $m^{th}$ static weighting factor;
"M" is a number of the static parameters;
"$Dynam_n$" is a value of an $n^{th}$ dynamic parameter associated with the storage device of the particular one of the plurality of files;
"δ" is a value of an $n^{th}$ dynamic weighting factor; and
"N" is a number of the dynamic parameters.

In accordance with aspects of the invention, the static and dynamic parameters are indicative of the reliability, health, and/or user preference of the storage devices where duplicate files are stored. In this manner, by calculating a weight for each file according to expression 550, the deduplication systems and methods in implementations of the invention enhance the deduplication process by storing the master copy in a most reliable and/or user preferred storage device.

Flow Diagrams

Figure 6:
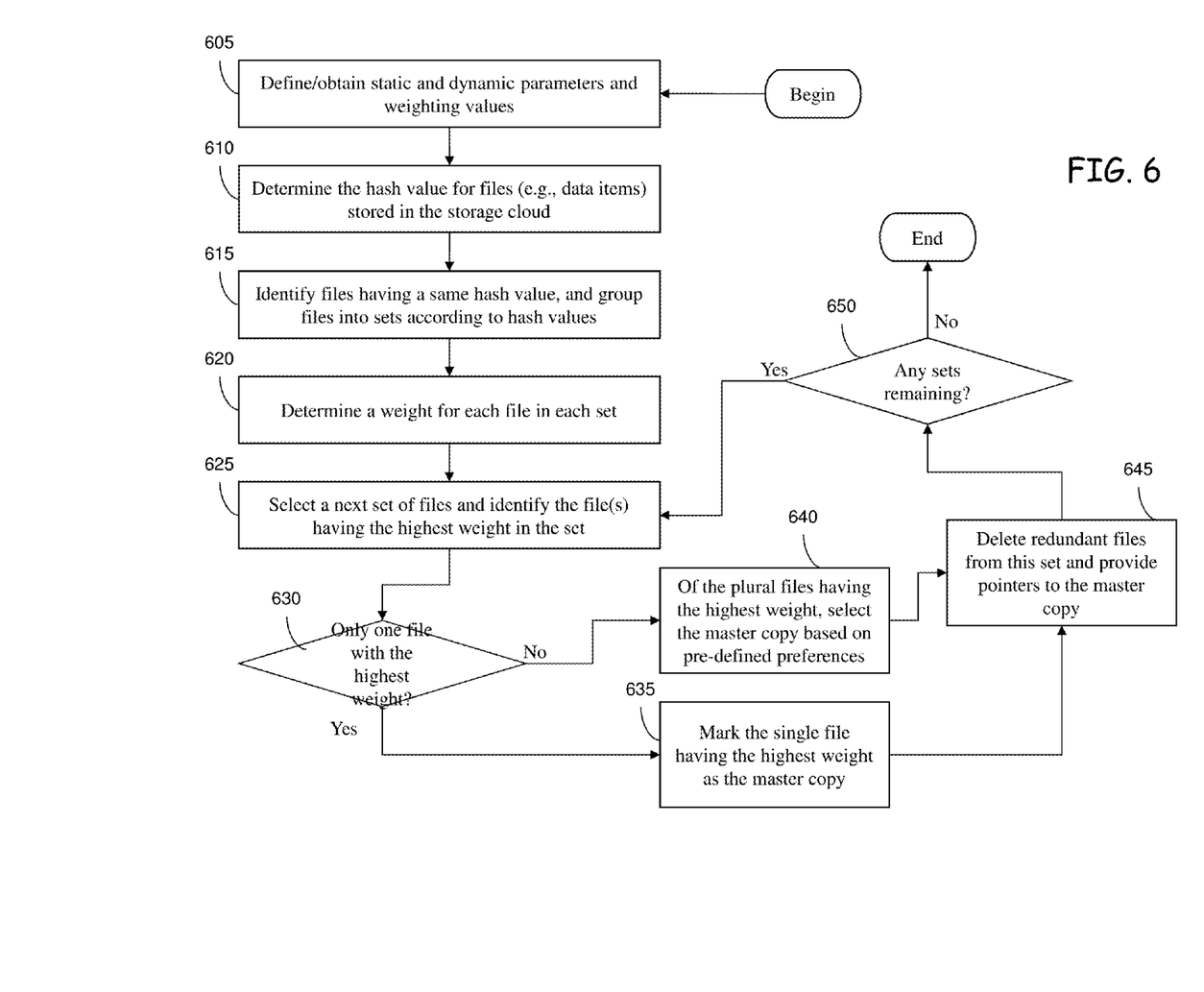
FIGS. 6 and 7 depict exemplary flow diagrams in accordance with aspects of the invention.
Figure 7:
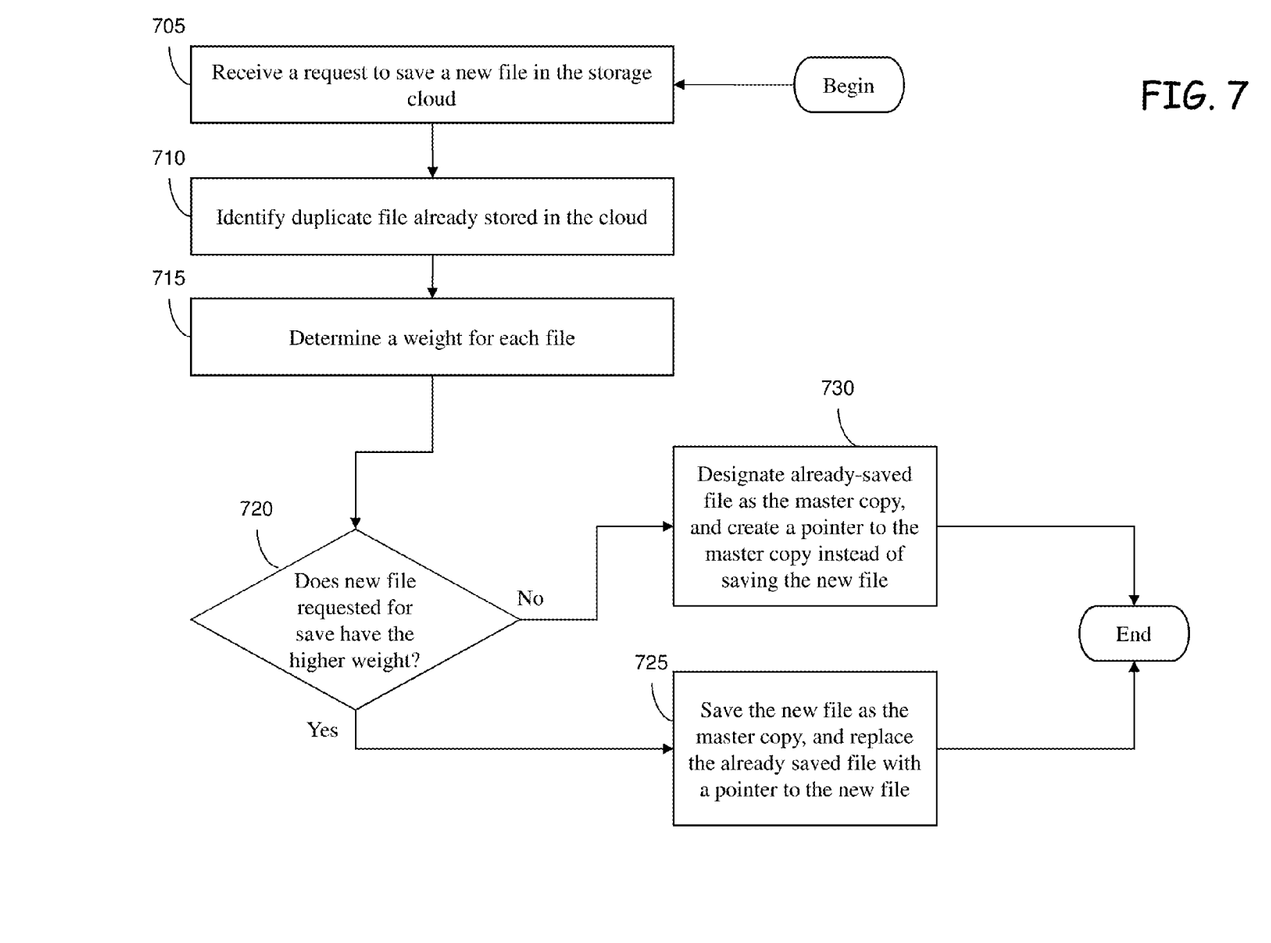

FIGS. 6 and 7 show exemplary flows for performing aspects of the present invention. The steps of FIGS. 6 and 7 may be implemented in any of the environments of FIGS. 1-4, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flow for a post deduplication process in accordance with aspects of the present invention. At step 605, a deduplication system (e.g., a computer system 12 running the identification engine 80 and selection engine 83) defines and/or obtains the static parameters, dynamic parameters, and weighting values (e.g., information similar to that shown in Tables 510, 520, 530, and 540 of FIG. 5). In embodiments, the deduplication system obtains this information through at least one of user input, accessing such information in a database (e.g., deduplication database 85), and polling the storage devices for such information, e.g., as described above with respect to FIG. 5. Although step 605 is depicted in FIG. 6 as occurring prior to steps 610 and 615, it is noted that step 605 may additionally or alternatively be performed between steps 610 and 615 or between steps 615 and 620.

At step 610, the identification engine (e.g., identification engine 80) determines a hash value for each file stored in a storage cloud or other distributed storage system. In embodiments, the identification engine applies a hash algorithm to each file (e.g., files 75, 75', etc.) stored at various storage devices (e.g., storage devices 90a, 90b, etc.) in a storage cloud, e.g., as described above with respect to FIG. 4.

At step 615, the identification engine identifies files having the same hash value and groups files into sets according to the hash values. For example, all files having a first hash value are grouped into a first set, all files having a second hash value are grouped into a second set, etc. Each set thus contains a group of duplicate files that are eligible for deduplication, since all files in any given set each have a same hash value.

At step 620, the selection engine (e.g., selection engine 83) determines a weight for each file in each set. In accordance with aspects of the invention, the selection engine determines a weight of a particular file based on static parameter values, dynamic parameter values, and weighting factor values from step 605, e.g., using expression 550 in the manner described with respect to FIG. 5.

At step 625, the selection engine analyzes a particular set of files to determine which file in the set has the highest weight. For example, for a particular set of duplicate files (identified at step 615), the selection engine compares the weight of each file (determined at step 620) and identifies the file(s) having the highest weight.

At step 630, the selection engine determines whether there is only one file having the highest weight in the set. It is possible that two files in a set of duplicate files will have the same weight. In the case that there is only one file having the highest weight in the given set, then at step 635, the selection engine designates that one file as the master copy for this set of duplicate files.

On other hand, when plural files in a set each have an equal highest weight, then at step 640, the selection engine determines the master copy from these highest weight files based on pre-defined preferences. For example, the system and method may permit a user to designate one of the static or dynamic parameters (e.g., Static1: vendor weight) as a tie-breaker parameter. As another example, the tie-breaker parameter may be an additional parameter not included in the static and dynamic parameters. For example, the tie-breaker parameter may be a number of master copies already stored on a storage device with the file, a physical location of the file copy on a storage device, or other parameters that are ascertainable by the selection engine. At step 640, when plural files in a set each have an equal highest weight, the selection engine compares the values of the tie-breaker parameter for each of the files having the equal highest weight, and designates the file with the highest value of tie-breaker parameter as the master copy.

At step 645, the deduplication system deletes the remaining files in the set (e.g., all files in the set except for the master copy as determined at step 635 or 640). In normal deduplication fashion, the deleted files are replaced with a pointer that points to the master copy.

At step 650, the deduplication system determines if there are any remaining sets to analyze for a master copy. When all sets identified at step 615 have not yet been analyzed through steps 630, 635 or 640, and 645, then the process returns to step 625 to analyze the next set. On the other hand, when all set have been analyzed for a master copy (e.g., steps 630, 635 or 640, and 645), then the process ends. In this manner, implementations of the invention may be used to perform a post deduplication in which a master copy is selected based on weights described herein.

FIG. 7 depicts an exemplary flow for an inline deduplication process in accordance with aspects of the present invention. At step 705, a deduplication system receives a request for storing a new file at a storage device in the cloud. In embodiments, this involves a computing device (e.g., node 10) receiving a request from a user (e.g., local computing device 54) to store a file (e.g., file 75) at a location in the cloud. The request may include a designation of a particular storage device on which to save a new file.

At step 710, the deduplication system identifies a duplicate file that is already stored in the cloud. This may be performed in a manner similar to steps 610 and 615 described with respect to FIG. 6. For example, an identification engine (e.g., identification engine 80) running on the computing device may determine a hash value for the file to be saved (from step 705) and compare this hash value to hash values of other files already stored in the cloud. Any file having a same hash value as the file from step 705 is a duplicate of that file.

At step 715, the deduplication system determines a weight for the new file of step 705 and the duplicate file identified at step 710. This may be performed in a manner similar to step 620 described with respect to FIG. 6. For example, a selection engine (e.g., selection engine 83) running on the computing device may determine a respective weight for each file using static parameters (e.g., Table 510), dynamic parameters (e.g., Table 520), weighting factors (e.g., Tables 530 and 540), and a weighting expression (e.g., expression 550). In order to perform step 715, the computing device running the selection engine may obtain the values of the static parameters, dynamic parameters, and weighting factors in any suitable manner, such as those already described herein.

At step 720, the system determines whether the new file (from step 705) or the already-saved file (from step 710) has the higher weight by comparing the respective weights of each file. When the new file has the higher weight, then at step 725 the new file is saved as the master copy at its designated storage device, and the already saved file is deleted and replaced with a pointer that points to the new file. On the other hand, when the already saved file has the higher weight, then at step 730, the already saved file is marked as the master copy. Still referring to step 730, a pointer that points to the master copy is created and saved instead of saving the new file. In this manner, implementations of the invention may be used to perform an inline deduplication in which a master copy is selected based on weights described herein.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of file deduplication implemented in a computer infrastructure comprising a combination of hardware and software, the method comprising:
    performing, by a computer processor, a file deduplication process comprising:
        determining, by the computer processor, a weight for each of a plurality of duplicate files, wherein the weight is based on: (i) parameters associated with a respective storage device of each of the plurality of duplicate files and (ii) a respective weighting factor associated with each one of the parameters; and
        obtaining numerical values for the each one of the parameters and the respective weighting factors; and
        designating, by the computer processor, one of the plurality of duplicate files as a master copy based on the determined weight.

2. The method of claim 1, wherein the parameters comprise static parameters and dynamic parameters.

3. The method of claim 1, wherein the parameters comprise at least one of vendor weight, mean time between failure, read performance, write performance, availability, and durability of a respective said storage device.

4. The method of claim 1, wherein the parameters comprise at least one of head flying height, remapped sector, error counts, spin up time, temperature, and data throughput of a respective said storage device.

5. The method of claim 1, wherein the weight of a particular one of the plurality of files is determined according to:

$$\text{Weight} = \left(\sum_{m=1}^{M} \beta_m * Static_m\right) + \left(\sum_{n=1}^{N} \delta_n * Dynam_n\right)$$

where:
"$Static_m$" is a value of an $m^{th}$ static parameter associated with the storage device of the particular one of the plurality of files;
"$\beta$" is a value of an $m^{th}$ static weighting factor;
"M" is a number of the static parameters;
"$Dynam_n$" is a value of an $n^{th}$ dynamic parameter associated with the storage device of the particular one of the plurality of files;
"$\delta$" is a value of an $n^{th}$ dynamic weighting factor; and
"N" is a number of the dynamic parameters.

6. The method of claim 1, further comprising replacing remaining ones of the plurality of duplicate files, other than the master copy, with respective pointers pointing to the master copy.

7. The method of claim 1, further comprising performing the determining and the designating as part of a post deduplication process in a cloud environment.

8. The method of claim 1, further comprising performing the determining and the designating as part of an inline deduplication process in a cloud environment.

9. The method of claim 1, wherein a service provider at least one of creates, maintains, deploys and supports the computer infrastructure.

10. The method of claim 1, wherein steps of claim 1 are provided by a service provider on a subscription, advertising, and/or fee basis.

11. A system comprising:
    one or more computer processors;
    one or more computer readable hardware storage device;
    program instructions stored on the one or more computer readable hardware storage device for execution by at least one of the one or more processors, the program instructions comprising:
    program instructions to identify duplicate files stored at different storage devices;
    program instructions to determine a weight for each one of the duplicate files based on:
    (i) parameters associated with the storage devices and (ii) weighting factors defined for the parameters; and
    program instructions to designate one of the duplicate files as a master copy based on the determined weights.

12. The system of claim 11, wherein the parameters are related to at least one of reliability, health, and user preference of the storage devices on which the duplicate files are stored.

13. The system of claim 11, wherein:
    the parameters include at least one of vendor weight, mean time between failure, read performance, write performance, availability, and durability of the storage devices; and
    the parameters include at least one of head flying height, remapped sector, error counts, spin up time, temperature, and data throughput of the storage devices.

14. A computer program product comprising:
one or more computer readable hardware storage device and program instructions stored on the one or more computer readable hardware storage device, the program instructions comprising:
program instructions to determine a hash value for each of a plurality of files;
program instructions to determine a set of duplicate files based on the hash values; and
program instructions to deduplicate the set of duplicate files, wherein the deduplicating comprises:
  determining a weight for each one of the duplicate files, wherein the weight is based on parameters associated with storage devices;
  designating a master copy of the set based on the weight of each one of the duplicate files; and
  nominating remaining files in the set, other than the master copy, for deletion.

15. The computer program product of claim 14, wherein the parameters comprise static parameters that are related to at least one of reliability, health, and user preference of the storage devices.

16. The computer program product of claim 14, wherein the storage devices are different nodes in a cloud environment.

* * * * *